US012366096B2

(12) United States Patent
Cunningham et al.

(10) Patent No.: US 12,366,096 B2
(45) Date of Patent: Jul. 22, 2025

(54) OPERATION LOGIC FOR A POWER HOOD SYSTEM

(71) Applicant: Toyota Motor Engineering & Manufacturing North America, Inc., Plano, TX (US)

(72) Inventors: James D. Cunningham, Clarkston, MI (US); Corey B. Sargent, Novi, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 183 days.

(21) Appl. No.: 18/239,650

(22) Filed: Aug. 29, 2023

(65) Prior Publication Data

US 2025/0075537 A1 Mar. 6, 2025

(51) Int. Cl.
*E05B 81/56* (2014.01)
*E05B 81/66* (2014.01)
*E05F 15/622* (2015.01)

(52) U.S. Cl.
CPC .............. *E05B 81/56* (2013.01); *E05B 81/66* (2013.01); *E05F 15/622* (2015.01); *E05Y 2400/40* (2013.01); *E05Y 2900/536* (2013.01)

(58) Field of Classification Search
CPC .......... E05B 81/56; E05B 81/66; E05B 83/24; E05F 15/622; E05Y 2400/40; E05Y 2900/536
USPC .......................................................... 701/49
See application file for complete search history.

(56) References Cited

U.S. PATENT DOCUMENTS

| | | | | |
|---|---|---|---|---|
| 6,293,050 | B1 | 9/2001 | Johnk | |
| 6,499,555 | B2 * | 12/2002 | Ishizaki | B60R 21/0136 180/274 |
| 6,568,495 | B1 * | 5/2003 | Corder | E05F 15/63 296/76 |
| 6,637,536 | B1 | 10/2003 | Polz et al. | |
| 8,494,701 | B2 | 7/2013 | Philipp et al. | |
| 8,646,556 | B2 | 2/2014 | Shimada et al. | |
| 8,935,053 | B2 * | 1/2015 | Wheeler | E05B 81/14 361/170 |
| 9,103,312 | B2 | 8/2015 | Moriya | |

(Continued)

FOREIGN PATENT DOCUMENTS

| | | | |
|---|---|---|---|
| DE | 2045423 | A1 | 3/1972 |
| DE | 202017105516 | * | 11/2017 |

*Primary Examiner* — Muhammad Shafi
(74) *Attorney, Agent, or Firm* — Snell & Wilmer LLP

(57) ABSTRACT

Methods, systems, and apparatus for a power hood system. The power hood system includes a powered hood rotatable between a closed position and an open position, at least one hood latch (e.g., a primary hood latch and/or a secondary hood latch) configured to secure the powered hood in the closed position (or a half latch position). The power hood system further includes an electronic control unit electrically coupled to the power hood. The electronic control unit is configured to automatically control the powered hood to move to the closed position in response to (1) receiving a drive mode signal indicating that the vehicle has been shifted into drive and (2) receiving a latch position signal indicating that a hood latch (e.g., the secondary hood latch) is not in the latched state.

15 Claims, 3 Drawing Sheets

(56) References Cited

U.S. PATENT DOCUMENTS

| | | | | |
|---|---|---|---|---|
| 9,340,109 | B2 | 5/2016 | Kato et al. | |
| 9,932,951 | B2 | 4/2018 | Lynch | |
| 10,480,239 | B1 | 11/2019 | Wisneski et al. | |
| 11,007,972 | B2 * | 5/2021 | Miller | E05B 83/24 |
| 11,111,894 | B2 | 9/2021 | Dudar et al. | |
| 11,400,887 | B2 | 8/2022 | Luchner | |
| 2011/0288743 | A1 | 11/2011 | Smith | |
| 2015/0191943 | A1 * | 7/2015 | Tieman | E05B 85/26<br>292/195 |
| 2017/0096845 | A1 * | 4/2017 | Bendel | E05B 81/52 |
| 2017/0268265 | A1 * | 9/2017 | Hiramoto | E05B 83/40 |
| 2019/0055759 | A1 * | 2/2019 | Roth | E05C 3/14 |
| 2019/0234118 | A1 * | 8/2019 | Krishnan | E05B 83/34 |
| 2020/0190869 | A1 * | 6/2020 | P | E05B 83/24 |
| 2021/0237804 | A1 * | 8/2021 | Gillis | E05B 83/26 |
| 2022/0144211 | A1 | 5/2022 | Lee | |

* cited by examiner

OPERATION LOGIC FOR A POWER HOOD SYSTEM

BACKGROUND

Field

The present disclosure relates to vehicles having a front compartment hood/lid and more particularly to systems and methods for operating a vehicle having a front compartment hood/lid.

Description of the Related Art

Many vehicles include a front hood assembly having a front hood that is hinged to the chassis of the vehicle and is lockable via at least one hood lock. The front hood can be inadvertently left in an unlatched, or only partially latched, position. Failure to properly secure the front hood in the fully latched position can result in the front hood opening while the vehicle is being operated. For example, air pressure can build up under the front hood at high speeds due to the aerodynamics of the front hood, which can cause the front hood to inadvertently open and block the front view of an operator of the vehicle.

Accordingly, it is desirable to provide systems, methods, and techniques for safely operating a vehicle having a front hood assembly.

SUMMARY

In general, one aspect of the subject matter described in this disclosure may be embodied in a power hood system for a vehicle. The power hood system can include a powered hood rotatable between a closed position and an open position, a primary hood latch configured to secure the powered hood in the closed position when the primary hood latch is in a latched state, a secondary hood latch configured to stop the powered hood from moving to the open position when the primary hood latch is in an unlatched state, and an electronic control unit electrically coupled to the powered hood. The electronic control unit can be configured to receive a drive mode signal indicating that the vehicle has been shifted into drive. The electronic control unit can be further configured to receive, at a first time, a first latch position signal indicating a state of the secondary latch. The electronic control unit can be further configured to control the powered hood to move the powered hood to the closed position in response to (1) receiving the drive mode signal and (2) the first latch position signal indicating that the secondary hood latch is not in the latched state.

These and other embodiments may optionally include one or more of the following features. In response to (1) receiving the drive mode signal and (2) the first latch position signal indicating that the secondary hood latch is not in the latched state, the electronic control unit can be further configured to activate a warning signal to a user interface to display to an operator of the vehicle that the powered hood is not fully latched. In response to (1) receiving the drive mode signal and (2) the first latch position signal indicating that the secondary hood latch is not in the latched state, the electronic control unit can be further configured to activate a maximum speed limit of the vehicle. Subsequent to controlling the powered hood to move to the closed position, the electronic control unit can be configured to detect, at a second time, whether the secondary hood latch is in the latched state, and in response to detecting that the secondary hood latch is in the latched state, deactivate the maximum speed limit of the vehicle. In response to the electronic control unit detecting that the secondary hood latch is in the latched state, the electronic control unit can be further configured to detect whether the primary hood latch is in the latched state. The electronic control unit can be further configured to receive a second latch position signal indicating a state of the primary hood latch, and in response to the second latch position signal indicating that the primary hood latch is not in the latched state, control the primary hood latch to move to the latched state to secure the hood in the closed position. The electronic control unit can be further configured to deactivate a warning signal in response to the primary hood latch being moved to the latched state.

In another aspect, the subject matter may be embodied in a method of controlling a vehicle. The method can include receiving, by a processor, a drive mode signal of the vehicle indicating whether the vehicle is in drive. The method can further include receiving, by the processor at a first time, a first hood latch position signal indicating whether a secondary hood latch is in a latched state. The method can further include, in response to (1) the drive mode signal indicating that the vehicle is in drive and (2) the first hood latch position signal indicating that the secondary hood latch is not in the latched state, controlling, by the processor, a powered hood to move to a closed position.

These and other embodiments may optionally include one or more of the following features. The method can further include, in response to (1) the drive mode signal indicating that the vehicle is in drive and (2) the first hood latch position signal indicating that the secondary hood latch is not in the latched state, activating, by the processor, a maximum speed limit of the vehicle. The method can further include, in response to (1) the drive mode signal indicating that the vehicle is in drive and (2) the first hood latch position signal indicating that the secondary hood latch is not in the latched state, activating, by the processor, a warning signal to a user interface to display to an operator of the vehicle that the powered hood is not fully latched. The method can further include receiving, by the processor at a second time, a second hood latch position signal indicating whether the secondary hood latch is in the latched state. The method can further include, in response to the second hood latch position signal indicating that the secondary hood latch is in the latched state, deactivating, by the processor, the maximum speed limit of the vehicle, and controlling, by the processor, a primary hood latch to move to the latched state. The method can further include, in response to (1) the drive mode signal indicating that the vehicle is in drive and (2) the first hood latch position signal indicating that the secondary hood latch is in the latched state, detecting, by the processor, whether a primary hood latch is in the latched state. The method can further include, in response to the processor determining that the primary hood latch is in the latched state, controlling, by the processor, the primary hood latch to move to the latched state.

In another aspect, the subject matter may be embodied in a power hood system for a vehicle including a vehicle hood rotatable between a closed position and an open position, a first hood latch configured to secure the vehicle hood in the closed position, an actuator configured to rotate the vehicle hood between the open position and the closed position, and an electronic control unit electrically coupled to the actuator. The electronic control unit can be configured to receive a drive mode signal indicating that the vehicle has been shifted into drive, receive, at a first time, a first latch position signal indicating a state of the first hood latch, and, in response to (1) receiving the drive mode signal and (2) the first latch position signal indicating that the first hood latch is not in a latched state, control the actuator to move the vehicle hood to the closed position.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, methods, devices, and/or vehicles for implementing a powered front hood (e.g., an engine compartment hood, a front trunk "frunk" compartment lid, etc.) on a vehicle. Aspects and/or embodiments are directed to controlling one or more components of the vehicle front hood assembly responsive to the vehicle being shifted into drive (e.g., from park (P) to drive (D)). When the vehicle is shifted into drive, an electronic control unit can detect that the vehicle has been shifted into drive and detect whether one or more of the front hood latches are in their respective latched state. The latched state may refer to a state where the front hood is fully latched and secured via respective front hood latches. In response to the electronic control unit detecting that a hood latch is not in a latched state, the power hood system can issue a warning to a vehicle operator indicating that the front hood is not fully latched, limit a maximum vehicle speed, automatically operate the powered front hood in a closing direction, and/or control the hood latch to move to a fully latched position.

Particular embodiments of the subject matter described in this disclosure may be implemented to realize one or more of the following advantages. By limiting vehicle speed until the front hood is fully latched, the powered hood system can prevent the front hood from inadvertently opening and blocking the front view of an operator of the vehicle. Moreover, automatic detection and closure of the front hood increases operator convenience. For example, a vehicle operator can remain seated in the vehicle until the front hood is fully latched (i.e., no user input is required). Various embodiments increase vehicle safety for both the vehicle operator and pedestrians.

Figure 1:
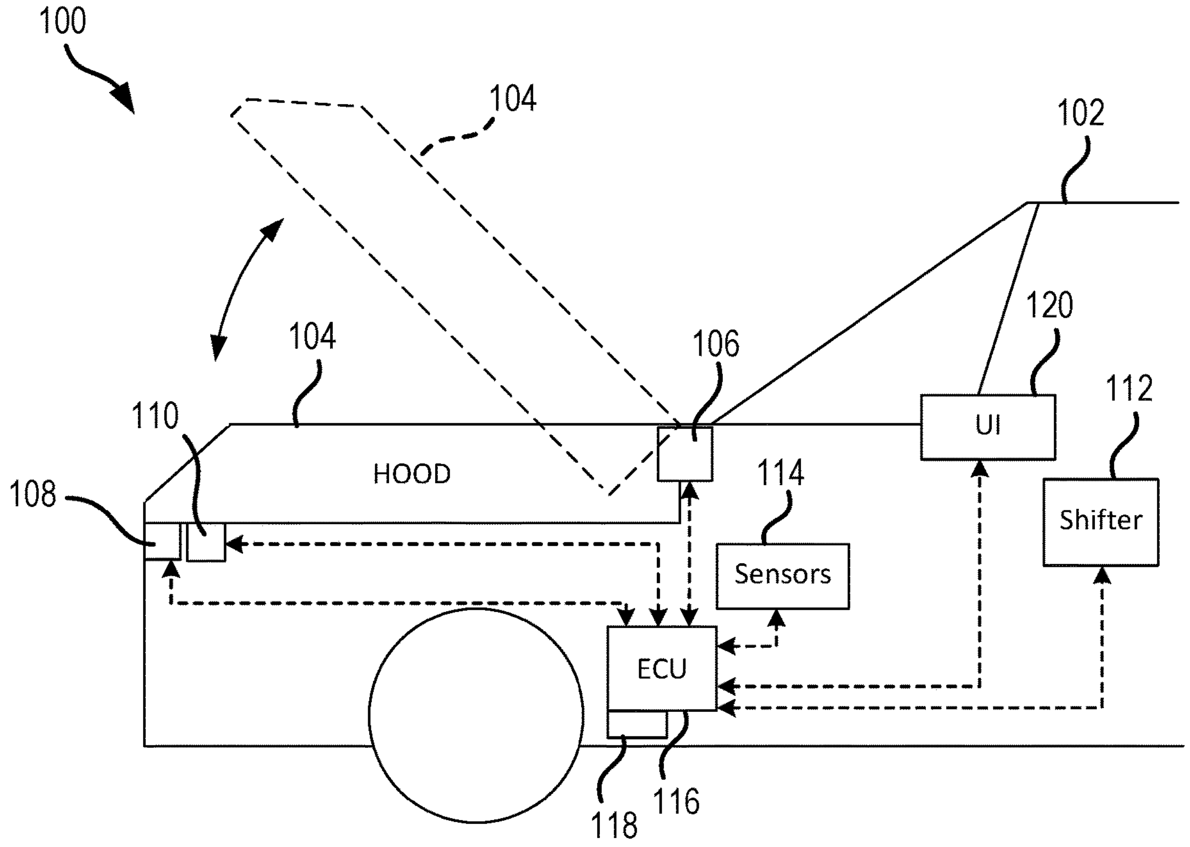
FIG. 1 is a block diagram of an example power hood system according to an aspect of the invention.

FIG. 1 is a block diagram of a power hood system 100. The power hood system 100 can include a hood 104 (also referred to herein as a powered hood) that may retrofit, couple to, include, or be included within a vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of electric/hybrid vehicle. Other examples of vehicles include bicycles, trains, planes, or boats, and any other form of conveyance that is capable of transportation. The vehicle 102 may be semi-autonomous or autonomous.

The hood 104 can be a front hood of the vehicle (e.g., an engine bay hood or a front trunk "frunk" hood). The hood 104 can be a rear hood of the vehicle (e.g., a trunk lid or a trunk hood). The power hood system 100 can further include powered hinge 106 for rotating the hood 104 between an open position (shown with dashed lines in FIG. 1) and a closed position (shown with solid lines in FIG. 1). The powered hinge 106 can include a spindle drive actuator, an electric motor and shaft, or any other suitable actuator for rotating the hood 104 between the open and closed positions. In various embodiments, the powered hinge 106 can be located at a hinge point of the hood 104. The powered hinge 106 can be powered by a vehicle battery or a separate battery or power source.

The power hood system 100 can further include one or more latches for securing the hood 104 in a closed position. For example, a hood 104 configured as a front hood can include a primary latch 108 (also referred to herein as a second hood latch) and a secondary latch 110 (also referred to herein as a first hood latch): though the present disclosure is not limited in this regard and a hood 104 of the present disclosure can be secured with any number of latches.

The power hood system 100 can further include a transmission shifter 112. The transmission shifter 112 can be a lever, a button, a knob, or any other suitable input device whereby a driver may shift a transmission of the vehicle 102. The driver may manipulate the transmission shifter 112 to select a parking range (P), a reverse range (R), a neutral range (N), or a drive range (D) based on the driving condition. Some transmission shifters 112 can further be manipulated to select a manual transmission range (M) in which shifting is performed by a driver. Some transmission shifters 112 can be manipulated between specific gears e.g., a parking range (P), a reverse range (R), a neutral range (N), a first gear range (1), a second gear range (2), a third gear range (3), etc. In this regard, the term "in drive" or "shifted into drive" as used herein can be used to refer to a reverse range (R), a drive range (D), or any of the individual gears (1), (2), (3), etc. Accordingly, the shifter 112 can be located in the cabin of the vehicle 102 within reach of a driver.

The power hood system 100 can further include one or more sensors 114 (e.g., one or more latch position sensor(s), a vehicle speed sensor, a shifter position sensor, etc.). Accordingly, the one or more sensors 114 can be configured to detect a speed or a velocity of the vehicle 102 (e.g., a vehicle speed sensor). The one or more sensors 114 can be configured to detect a position of the powered hinge 106, the primary latch 108, the secondary latch 110, and/or the transmission shifter 112 (e.g., position sensors).

The power hood system 100 monitors a position of the shifter 112 and adjusts, controls, or manages (1) the position of the hood 104 and/or (2) a speed of the vehicle 102, accordingly. The power hood system 100 can adjust, control, or manage the position of the hood 104 and/or a speed of the vehicle 102 further according to a position of the one or more latches for the hood 104 (e.g., primary latch 108 and/or secondary latch 110). This ensures the hood 104 does not come open while driving, which improves the safety of the vehicle. Moreover, convenience to the vehicle operator is maximized by automatically closing the hood 104 when the vehicle 102 is placed in drive.

The power hood system 100 can further include one or more processors, such as an electronic control unit (ECU) 116 or other processor and a memory 118. The ECU 116 may be implemented as a single ECU or as multiple ECUs. The ECU 116 may be electrically coupled to some or all of the other components within the vehicle 102, such as the powered hinge 106, the primary latch 108, the secondary latch 110, the shifter 112, the one or more sensors 114, and/or the memory 118. The ECU 116 may include one or more processors or controllers specifically designed for detecting, monitoring, and/or controlling the speed of vehicle 102. The ECU 116 may include one or more processors or controllers specifically designed for detecting, monitoring, and/or controlling a position of the powered hinge 106, the primary latch 108, the secondary latch 110, and/or the shifter 112. Accordingly, the ECU 116 can monitor and/or control a position of the hood 104 and/or a speed of the vehicle 102.

The ECU 116 may be wired or wirelessly coupled to various components of the power hood system 100. For example, the ECU 116 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The ECU 116 may transmit data to and receive data from the components via the communication port. The communication port may be connected to the various components via a Dedicated Short-Range Communication (DSRC) network, a local area network (LAN), a wide area network (WAN), a Controller Area Network (CAN), a cellular network, the Internet, or combination thereof, that connects, couples and/or otherwise communicates among the multiple components.

The memory 118 may be coupled to the ECU 116 and store instructions that the ECU 116 executes. The memory 118 may include one or more of a Random Access Memory (RAM) or other volatile or non-volatile memory. The memory 118 may be a non-transitory memory or a data storage device, such as a hard disk drive, a solid-state disk drive, a hybrid disk drive, or other appropriate data storage, and may further store machine-readable instructions, which may be loaded and executed by the ECU 116 or other processor. For example, the memory 118 can store a speed limit value for the vehicle 102 to operate in response to one or more of the primary latch 108, the secondary latch 110, and the hood 104 being in an open position while the vehicle 102 is in drive. The memory 118 can store instructions in accordance with any of the methods described herein for monitoring and/or controlling various components of the power hood system 100 as described herein.

The power hood system 100 can further include a user interface 120. The power hood system 100 may display one or more notifications and/or alerts via the user interface 120. The one or more notifications may notify the user that a speed of the vehicle 102 is being limited and/or that the hood 104 is open or partially open. The user interface 120 may include an input/output device that receives user input, such as a user interface element, a button, a dial, a microphone, a keyboard, or a touch screen, and/or provides output, such as a display, a speaker, an audio and/or visual indicator, or a refreshable braille display. The user interface 120 may include a light and/or a speaker (e.g., for generating an audio signal, voice, chime, beeping, etc.).

The ECU 116 may be electrically coupled to the powered hinge 106 for controlling a position and/or a state of the powered hinge 106 and associated hood 104. The hood 104 is pivotally coupled to a frame of the vehicle 102 via the powered hinge 106. The powered hinge 106 can rotate the hood 104 between the open position and the closed position. Without the powered hood features of the present disclosure, a vehicle operator may have to get out of the vehicle to close the hood or may even be unaware that the hood is open or partially open. Without the powered hood features of the present disclosure, a vehicle operator may unknowingly operate the vehicle at high speeds where the risk of the hood coming completely open are elevated. The power hood system 100 monitors various vehicle conditions and, accordingly, controls vehicle speed, actuator position, and/or hood position.

Figure 2:
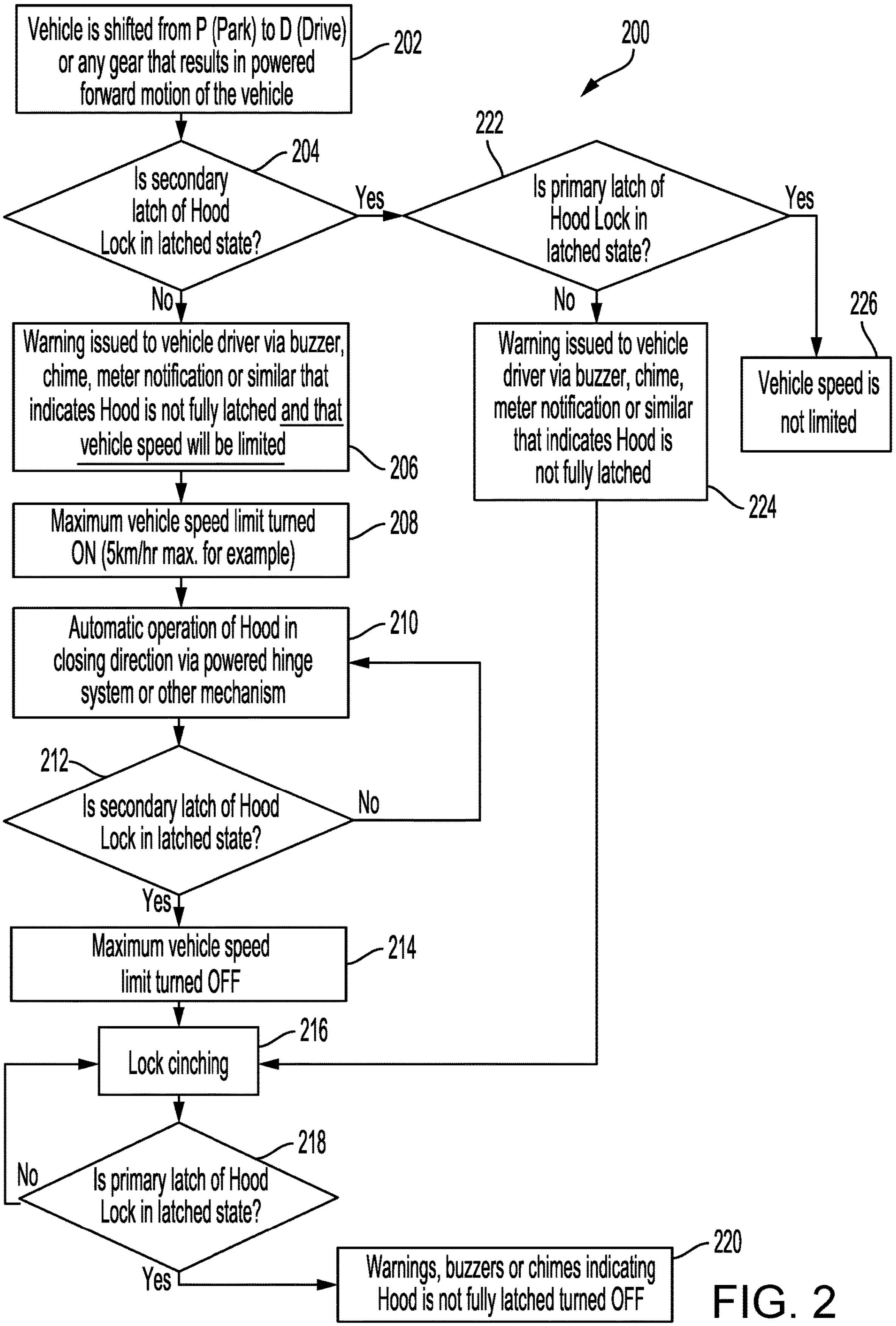
FIG. 2 is a flow diagram of an example process for controlling a vehicle according to an aspect of the invention.

FIG. 2 is a flow diagram of a process 200 for controlling a vehicle 102. One or more computers or one or more data processing apparatuses, for example, the ECU 116 of the power hood system 100, appropriately programmed, may implement the process 200.

The electronic control unit 116 can determine whether the vehicle 102 is shifted into drive (202). For example, the electronic control unit 116 can receive a drive mode signal from the shifter 112 indicating that the vehicle 102 has been shifted (e.g., via the shifter 112) into drive.

The electronic control unit 116 can detect whether the secondary latch 110 is in a latched state (204). In the latched state, the secondary latch 110 secures the hood 104 from fully opening.

In response to the electronic control unit 116 detecting that the secondary latch 110 is not in the latched state (e.g., an unlatched state or a partially latched state), the electronic control unit 116 can activate a warning signal to the user interface 120 to display to an operator of the vehicle that the vehicle hood 104 is not fully latched and/or that the vehicle speed will be limited (206).

In response to the electronic control unit 116 detecting that the secondary latch 110 is not in the latched state, the electronic control unit 116 can activate a maximum speed limit of the vehicle 102 (208). Stated differently, the electronic control unit 116 can limit the vehicle 102 from moving faster than the maximum speed limit. Accordingly, the vehicle 102 is limited from moving faster than the maximum speed limit when the hood 104 is not secured. The maximum speed limit can be 5 km/h or any other suitable speed so as to prevent the hood 104 from opening (e.g., via aerodynamic forces) during operation of the vehicle 102.

In response to the electronic control unit 116 detecting that the secondary latch 110 is not in the latched state, the electronic control unit 116 can control the hood 104 to move the hood 104 to the closed position (210). For example, the electronic control unit 116 can activate, power, and/or control the powered hinge 106 to rotate the hood 104 toward the closed position. Step 210 can happen automatically in response to the electronic control unit 116 (1) receiving the drive mode signal and (2) detecting that the secondary hood latch is not in the latched state.

Subsequent to commanding the powered hinge 106 to rotate the hood 104 toward the closed position, the electronic control unit 116 can continue monitoring the state of the secondary latch 110 to determine whether the secondary latch 110 is in the latched state (212). In response to the electronic control unit 116 detecting that the secondary latch 110 is not in the latched state, the electronic control unit 116 can continue to command the powered hinge 106 to rotate the hood 104 toward the closed position (210). In response to the electronic control unit 116 detecting that the secondary latch 110 is in the latched state (e.g., the hood 104 is in a half latch position), the electronic control unit 116 can deactivate the maximum vehicle speed limit (214).

The electronic control unit 116 can control the primary hood latch 108 to move to the latched state to secure the hood 104 in the fully closed position (216). Subsequent to commanding the primary latch 108 to move to the latched state, the electronic control unit 116 can continue monitoring the state of the primary latch 108 to determine whether the primary latch 108 is in the latched state (218). In response to the electronic control unit 116 detecting that the primary latch 108 is not in the latched state, the electronic control unit 116 can continue to command the primary latch 108 to move to the latched state (216). In response to the electronic control unit 116 detecting that the primary latch 108 is in the latched state (e.g., the hood 104 is in a fully latched position), the electronic control unit 116 can deactivate the warning signal to the user interface 120 to no longer display to the operator of the vehicle that the vehicle hood 104 is not latched (220).

In response to the electronic control unit 116 detecting that the secondary latch 110 is in the latched state, the electronic control unit 116 can detect whether the primary latch 108 is in a latched state (222). In the latched state, the primary latch 108 secures the hood 104 in a closed position. In response to the electronic control unit 116 detecting that the primary latch 108 is not in the latched state, the electronic control unit 116 can activate a warning signal to the user interface 120 to display to an operator of the vehicle that the vehicle hood 104 is not fully latched (224). The process 200 can then proceed to step 216. In response to the electronic control unit 116 detecting that the primary latch 108 is in the latched state, the vehicle speed is not limited and the vehicle 102 can operate without any interference or override from the power hood system 100.

Figure 3A:
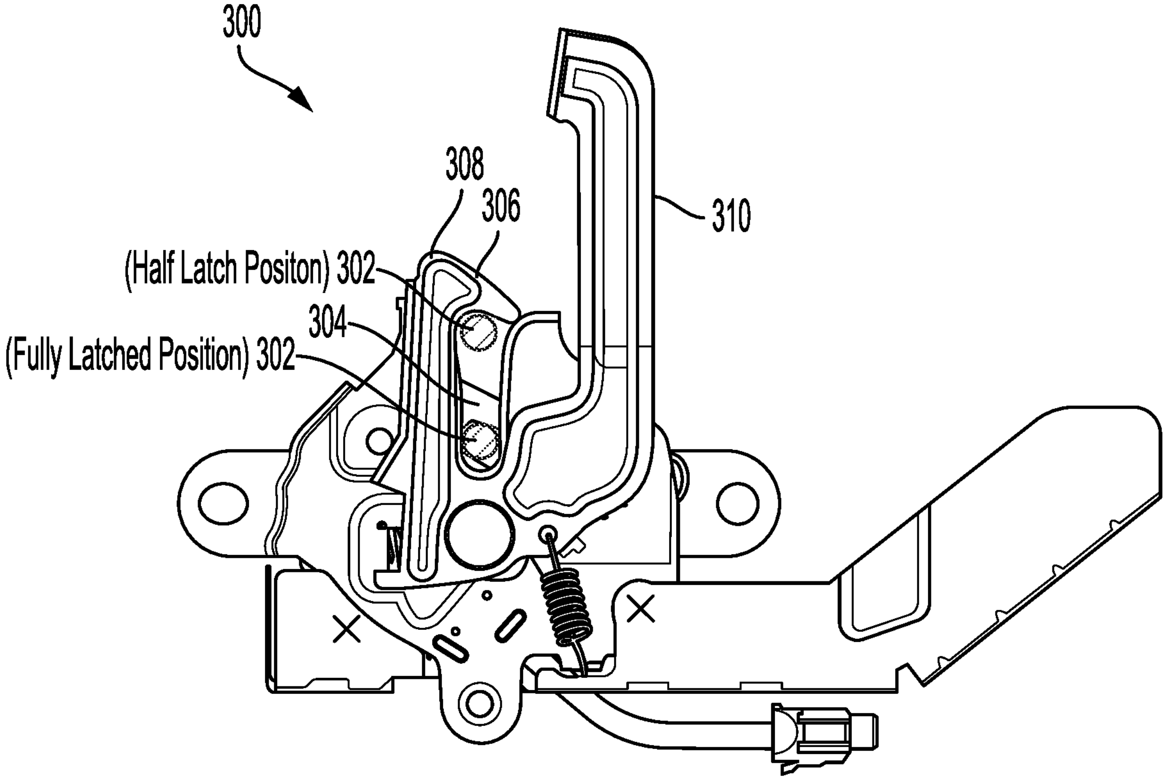
FIG. 3A is a front view of an exemplary hood latch assembly for a vehicle according to an aspect of the invention.
Figure 3B:
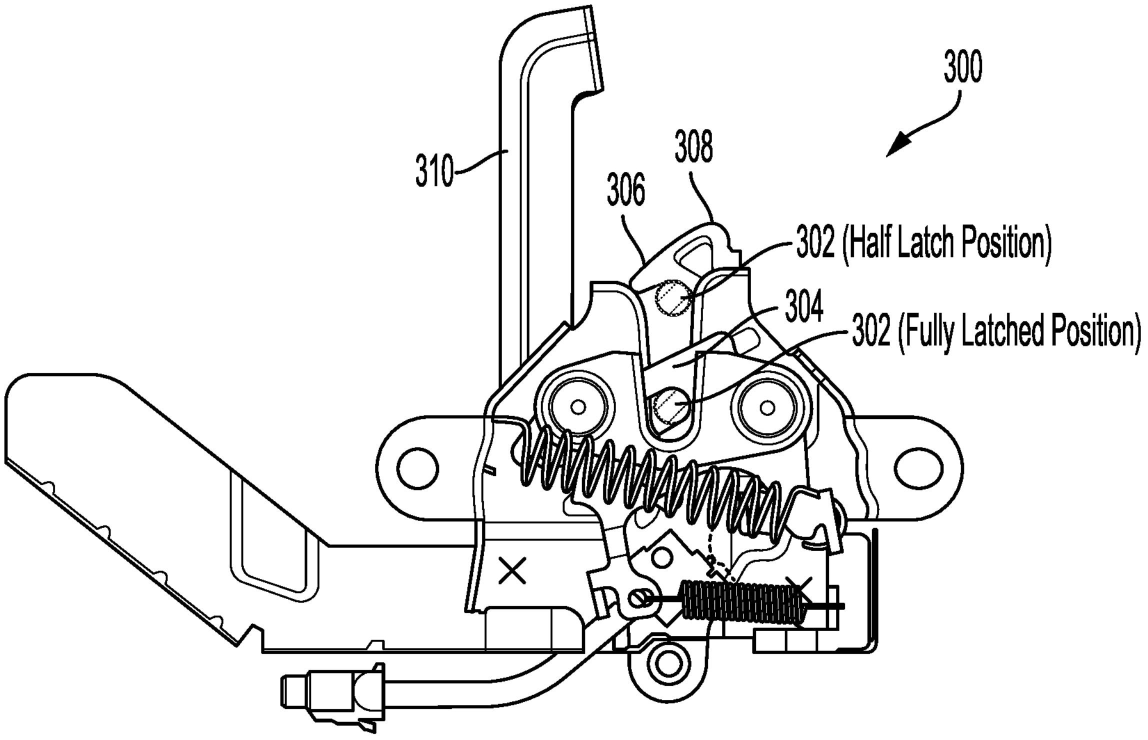
FIG. 3B is a rear view of the exemplary hood latch assembly of FIG. 3A according to an aspect of the invention.

FIG. 3A is a front view illustrating an exemplary hood latch assembly 300 for a vehicle. FIG. 3B is a rear view illustrating the hood latch assembly 300. In a fully latched position, a striker 302 is caught by a fork portion of a primary latch 304 to secure the hood in a fully closed position. When a driver or an operator opens the hood, the striker 302 caught by the fork portion (e.g., the primary latch 304) is unlocked by the operation of a hood lever installed within the vehicle, thereby allowing the hood to be popped up (e.g., opened) and slightly lifted up. The striker 302 can be released from the primary latch 304 and hooked and locked by a hook portion 306 of a secondary latch 308. In a half latch position, the striker 302 is caught by the secondary latch 308 and a gap is formed between the hood and a vehicle body. Additionally, a latch handle 310 of the secondary latch 308 may be operated by inserting a hand or other object into the gap formed between the hood and the vehicle body, and lifting the hood after releasing the hook portion 306, by which the striker 302 is hooked, to thus fully open the hood. Accordingly, the hood latch assembly 300 has a double latch structure.

In various embodiments, the primary latch 108 of FIG. 1 can be similar to the primary latch 304 of FIG. 3A and FIG. 3B. In various embodiments, the secondary latch 110 of FIG. 1 can be similar to the secondary latch 308 of FIG. 3A and FIG. 3B.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A power hood system for a vehicle, comprising:
- a powered hood rotatable between a closed position and an open position;
- a primary hood latch configured to secure the powered hood in the closed position when the primary hood latch is in a latched state;
- a secondary hood latch configured to stop the powered hood from moving to the open position when the primary hood latch is in an unlatched state; and
- an electronic control unit electrically coupled to the powered hood and configured to:
  - receive a drive mode signal indicating that the vehicle has been shifted into drive;
  - receive, at a first time, a first latch position signal indicating a state of the secondary latch; and
  - in response to (1) receiving the drive mode signal and (2) the first latch position signal indicating that the secondary hood latch is not in a latched state, activate a warning signal to a user interface to display to an operator of the vehicle that the powered hood is not in the closed position, control the powered hood to move the powered hood to the closed position, and deactivate the warning signal in response to the secondary hood latch being moved to the latched state.

2. The power hood system of claim 1, wherein, in response to (1) receiving the drive mode signal and (2) the first latch position signal indicating that the secondary hood latch is not in the latched state, the electronic control unit is further configured to activate a maximum speed limit of the vehicle.

3. The power hood system of claim 2, wherein, subsequent to controlling the powered hood to move to the closed position, the electronic control unit is configured to:
- detect, at a second time, whether the secondary hood latch is in the latched state; and
- in response to detecting that the secondary hood latch is in the latched state, deactivate the maximum speed limit of the vehicle.

4. The power hood system of claim 3, wherein, in response to the electronic control unit detecting that the secondary hood latch is in the latched state, the electronic control unit is further configured to detect whether the primary hood latch is in the latched state.

5. The power hood system of claim 4, wherein the electronic control unit is further configured to:
- receive a second latch position signal indicating a state of the primary hood latch; and
- in response to the second latch position signal indicating that the primary hood latch is not in the latched state, control the primary hood latch to move to the latched state to secure the powered hood in the closed position.

6. A method of controlling a vehicle, comprising:
- receiving, by a processor, a drive mode signal of the vehicle indicating whether the vehicle is in drive;
- receiving, by the processor at a first time, a first hood latch position signal indicating whether a secondary hood latch is in a latched state; and
- in response to (1) the drive mode signal indicating that the vehicle is in drive and (2) the first hood latch position signal indicating that the secondary hood latch is not in the latched state, activating, by the processor, a warning signal to a user interface to display to an operator of the vehicle that a powered hood is not in a closed position, controlling, by the processor, the powered hood to move to the closed position, and deactivating, by the processor, the warning signal in response to the secondary hood latch being moved to the latched state.

7. The method of claim 6, further comprising, in response to (1) the drive mode signal indicating that the vehicle is in drive and (2) the first hood latch position signal indicating that the secondary hood latch is not in the latched state, activating, by the processor, a maximum speed limit of the vehicle.

8. The method of claim 7, receiving, by the processor at a second time, a second hood latch position signal indicating whether the secondary hood latch is in the latched state:

in response to the second hood latch position signal indicating that the secondary hood latch is in the latched state:

deactivating, by the processor, the maximum speed limit of the vehicle; and controlling, by the processor, a primary hood latch to move to the latched state.

9. The method of claim 6, further comprising, in response to (1) the drive mode signal indicating that the vehicle is in drive and (2) the first hood latch position signal indicating that the secondary hood latch is in the latched state, detecting, by the processor, whether a primary hood latch is in the latched state.

10. The method of claim 9, further comprising, in response to the processor determining that the primary hood latch is in the latched state, controlling, by the processor, the primary hood latch to move to the latched state.

11. A power hood system for a vehicle, comprising:

a vehicle hood rotatable between a closed position and an open position;

a first hood latch configured to secure the vehicle hood in the closed position;

an actuator configured to rotate the vehicle hood between the open position and the closed position; and an electronic control unit electrically coupled to the actuator and configured to:

receive a drive mode signal indicating that the vehicle has been shifted into drive;

receive, at a first time, a first latch position signal indicating a state of the first hood latch; and in response to (1) receiving the drive mode signal and (2) the first latch position signal indicating that the first hood latch is not in a latched state, activate a warning signal to a user interface to display to an operator of the vehicle that the vehicle hood is not in the closed position, control the actuator to move the vehicle hood to the closed position, and deactivate the warning signal in response to the first hood latch being moved to the latched state.

12. The power hood system of claim 11, wherein, in response to (1) receiving the drive mode signal and (2) the first latch position signal indicating that the first hood latch is not in the latched state, the electronic control unit is further configured to activate a maximum speed limit of the vehicle.

13. The power hood system of claim 12, wherein, subsequent to controlling the actuator to move the vehicle hood to the closed position, the electronic control unit is configured to:

detect, at a second time, whether the first hood latch is in the latched state; and in response to detecting that the first hood latch is in the latched state, deactivate the maximum speed limit of the vehicle.

14. The power hood system of claim 13, further comprising a second hood latch configured to secure the vehicle hood in the closed position; and in response to the electronic control unit detecting that the first hood latch is in the latched state, the electronic control unit is further configured to detect whether the second hood latch is in the latched state.

15. The power hood system of claim 14, wherein the electronic control unit is further configured to:

receive a second latch position signal indicating a state of the second hood latch; and in response to the second latch position signal indicating that the second hood latch is not in the latched state, control the second hood latch to move to the latched state to secure the vehicle hood in the closed position.

* * * * *